(12) United States Patent
Daniel et al.

(10) Patent No.: US 8,451,109 B1
(45) Date of Patent: May 28, 2013

(54) SYSTEM AND METHOD FOR IMPROVING VEHICLE OPERATOR AWARENESS

(75) Inventors: Isaac Sayo Daniel, Miami, FL (US); Hortencia Daniel, Miami, FL (US)

(73) Assignee: F3M3 Companies, Inc., Miramar, FL (US)

( * ) Notice: Subject to any disclaimer, the term of this patent is extended or adjusted under 35 U.S.C. 154(b) by 497 days.

(21) Appl. No.: 12/683,554

(22) Filed: Jan. 7, 2010

(51) Int. Cl.
*B60Q 1/00* (2006.01)

(52) U.S. Cl.
USPC ........... 340/439; 340/575; 340/576; 340/438; 340/691.6; 340/461

(58) Field of Classification Search
USPC 340/575, 439, 576, 438, 691.6, 461; 180/272
See application file for complete search history.

(56) References Cited

U.S. PATENT DOCUMENTS

| | | | | |
|---|---|---|---|---|
| 4,259,665 A | * | 3/1981 | Manning | 340/575 |
| 6,859,143 B2 | * | 2/2005 | Braeuchle et al. | 340/576 |
| 2003/0189493 A1 | * | 10/2003 | Klausner et al. | 340/575 |
| 2008/0042856 A1 | * | 2/2008 | Power | 340/575 |
| 2008/0061954 A1 | * | 3/2008 | Kulas | 340/438 |
| 2008/0143504 A1 | * | 6/2008 | Martin Alvarez | 340/439 |
| 2011/0068921 A1 | * | 3/2011 | Shafer | 340/571 |
| 2011/0115617 A1 | * | 5/2011 | Bennett | 340/439 |

* cited by examiner

*Primary Examiner* — Hoi Lau
(74) *Attorney, Agent, or Firm* — Albert Interian, III

(57) ABSTRACT

A system that includes at least one processor, a first set of sensors connected to a first means for controlling a vehicle and electronically connected to the at least one processor, wherein the first set of sensors includes at least one sensor, a second set of sensors connected to a second means for controlling a vehicle and electronically connected to the at least one processor, wherein the second set of sensors includes at least one sensor, at least one alarm electronically connected to the at least one processor, and computer executable instructions readable by the at least one processor and operative to activate the at least one alarm when the first set of sensors detects the absence of an operator's hand, and the second set of sensors detects the absence of an operator's hand.

29 Claims, 13 Drawing Sheets

SYSTEM AND METHOD FOR IMPROVING VEHICLE OPERATOR AWARENESS

FIELD

The present disclosure relates generally to electronic systems, and more particularly, to systems, methods, and various other disclosures related to improving vehicle operator awareness, and more particularly to driver awareness.

BACKGROUND

Distractions have always been a danger for vehicle operators, especially car and truck drivers. Distractions such as falling asleep and changing the radio station can lead to a harmless fender bender, or can cause a fatal multiple-vehicle accident.

Recent advances in technology have presented drivers with even more distractions, such as mobile phones, laptop computers, personal digital assistants, digital cameras, and the like.

The advent of Bluetooth technology enabled devices, through which a driver is able to talk on a mobile phone without using their hands, has helped reduce the number of mobile phone related vehicle accidents, however accidents caused by drivers using their mobile phones to send text messages while driving is still pervasive. Texting and driving is particularly dangerous because sending a text message requires that a driver divert their attention from the road, remove their eyes from the road, and use one hand to key in a message on the mobile phone. Overall, the process of sending a text message on a phone can be quite cumbersome, and when coupled with driving, can be a deadly distraction.

SUMMARY

The various embodiments and disclosures described herein result from the realization that driver awareness can be improved by providing a system that detects and monitors the position of a vehicle operator's hands, and activates an alarm when the operator has at least one of his or her hands occupied by a non-driving activity.

The various embodiments and disclosures described herein result from the further realization that driver awareness can be improved by using a plurality of sensors to detect the position of a vehicle operator's hands, and activating an alarm when the operator has at least one of his or her hands occupied by a non-driving activity.

Accordingly, the various embodiments and disclosures described herein solve the limitations of the prior art in a new and novel manner.

DETAILED DESCRIPTION OF PREFERRED EMBODIMENTS

Figure 1A:
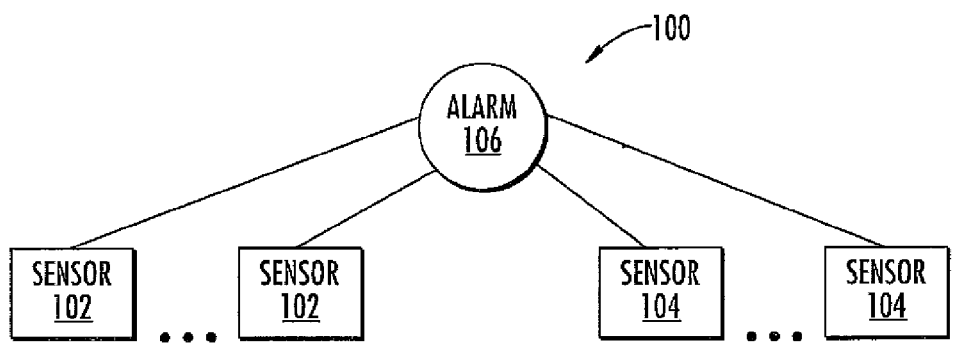
FIGS. 1A through 1C show a system in accordance with various embodiments.

FIG. 1A shows a block diagram of system 100, in accordance with one embodiment. System 100 may comprise of at least one first sensor 102 connected to at least one first means for controlling a vehicle 108, and at least one alarm 106 electronically connected to at least one first sensor 102. In another embodiment, system 100 further comprises at least one second sensor 104 connected to at least one second means for controlling a vehicle 100, and electronically connected to alarm 106.

In some embodiments, at least one first sensor 102 and at least one second sensor 104 may be any type of sensor, including, but not limited to, a capacitive sensor, a thermal sensor, temperature sensor, a pressure sensor, a light sensor, an optical sensor, a photoelectric sensor, and the like.

Figure 1B:
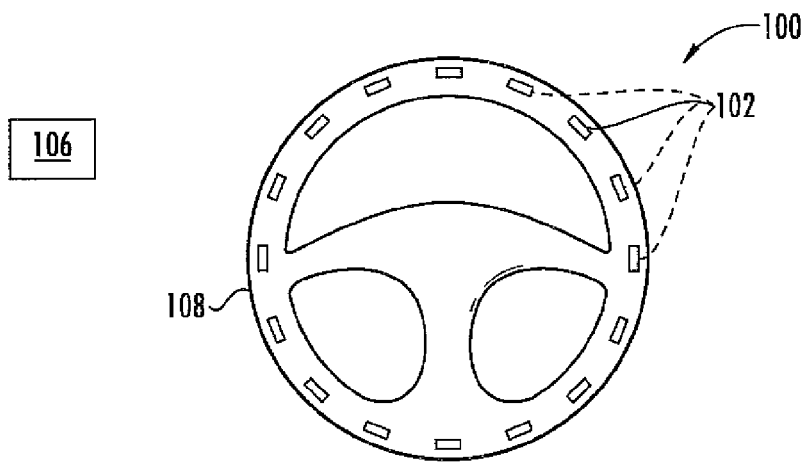

FIG. 1B shows one embodiment of system 100, wherein at least one first means for controlling a vehicle 108 may be steering wheel. In such an embodiment, at least one first sensor 102, or a plurality of sensors, may be positioned along the circumference of means for controlling a vehicle 108, namely the steering wheel as shown in FIG. 1B. In alternate embodiments, at least one first means for controlling a vehicle 108 may be any type of means for controlling a vehicle, including, but not limited to, a lever, a pedal, a shifter, a joystick, a button, and the like.

Figure 1C:
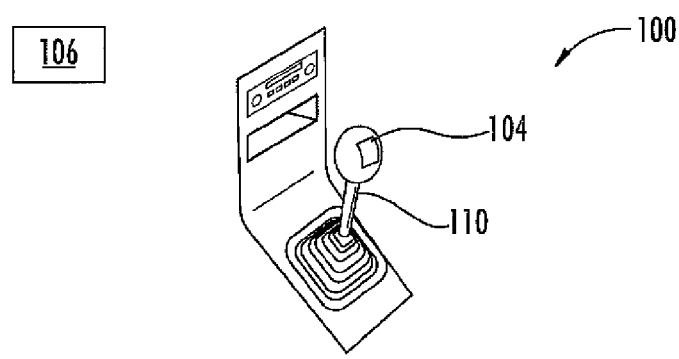

In another embodiment of system 100, as shown in FIG. 1C, at least one second means for controlling a vehicle 110 may be a shifter. In alternate embodiments, at least one second means for controlling a vehicle 110 may be any type of means for controlling a vehicle, including, but not limited to, a lever, a pedal, a steering wheel, a joystick, shifter, a button, and the like.

Figure 2A:
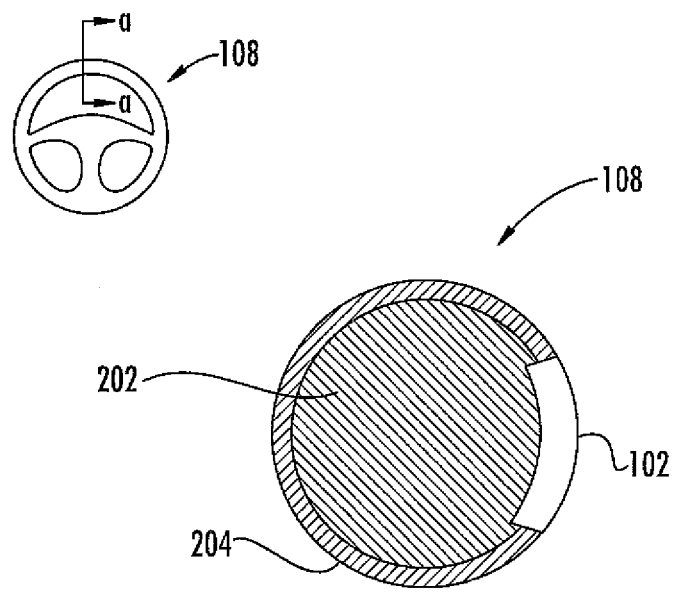
FIGS. 2A and 2B show cross sections of a system in accordance with various embodiments.

Referring now to FIG. 2A, a cross section a-a of one embodiment of first means for controlling a vehicle 108 is shown, wherein at least one first sensor 102 is positioned at the surface of means for controlling a vehicle 108. In embodiments where first means for controlling a vehicle 108 is a steering wheel, the steering wheel may comprise a core 202 and a cover 204. In such embodiments, at least one first sensor 102 may be embedded into cover 204 such that it appears at the surface of first means for controlling a vehicle 108, as shown in FIG. 2A.

Figure 2B:
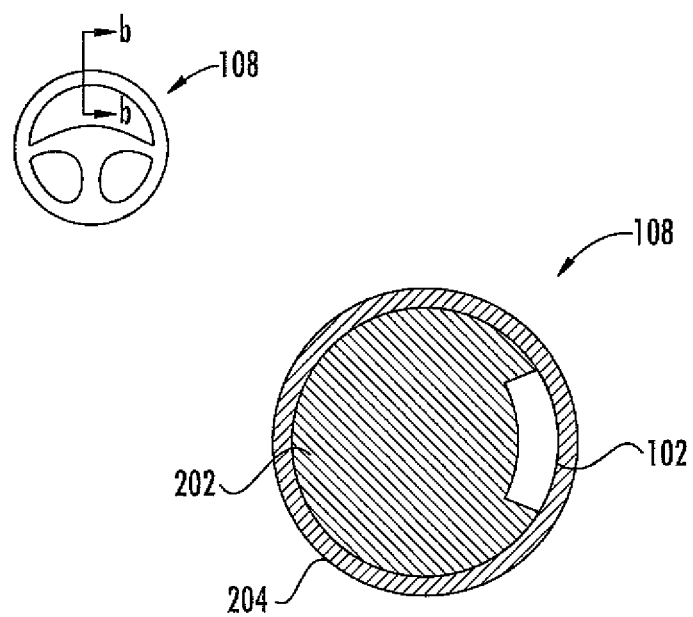

FIG. 2B shows yet another cross section b-b of another embodiment of first means for controlling a vehicle 108, wherein at least one first sensor 102 is embedded in core 202 of the steering wheel. In a further embodiment, at least one first sensor 102 is positioned near the surface of at least one first means for controlling a vehicle 108, and is covered and/or concealed by cover 204. In some embodiments, cover 204 may be of sufficient thinness so as to allow at least one first sensor 102 to detect the presence of an operator's hand near sensor 102. In embodiments where at least one first sensor 102 is a thermal sensor, cover 204 may be formed of a highly thermal conductive material, such as metal, or a highly conductive fiber.

In embodiments throughout the present disclosure, the detection a sensor performs may comprise of sensing the changes in electrical capacitance created by the presence of an object, such as an operator's hand, sensing thermal changes created by the presence of an object, or using image recognition software coupled to a camera to detect objects in the camera's field of view. In some embodiments, a sensor may be a camera positioned external to the vehicle control means, with its field of view directed towards the operator and the operator's hands. In such embodiments, image recognition software may be used to analyze the image captured by the camera to determine whether the operator is using his or her hands to drive, or whether the operator is using his or her hands to engage in a distracting activity, such as texting while driving, talking on the phone, eating, putting on make up, and the like.

Figure 3A:
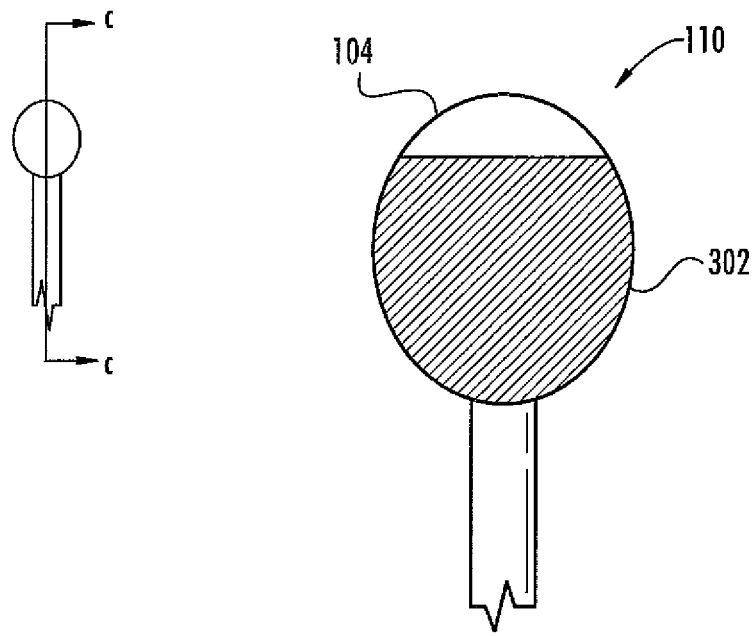
FIGS. 3A and 3B show cross sections of a system in accordance with various other embodiments.

Referring now to FIG. 3A, a cross section c-c of one embodiment of second means for controlling a vehicle 110 is shown, wherein at least one second sensor 104 is positioned at the surface of means for controlling a vehicle 110. In embodiments where second means for controlling a vehicle 110 is a shifter, the shifter wheel may comprise a shift knob 302. In such embodiments, at least one second sensor 104 may be connected to shift knob 302 such that it appears at the surface of second means for controlling a vehicle 110, as shown in FIG. 3A.

Figure 3B:
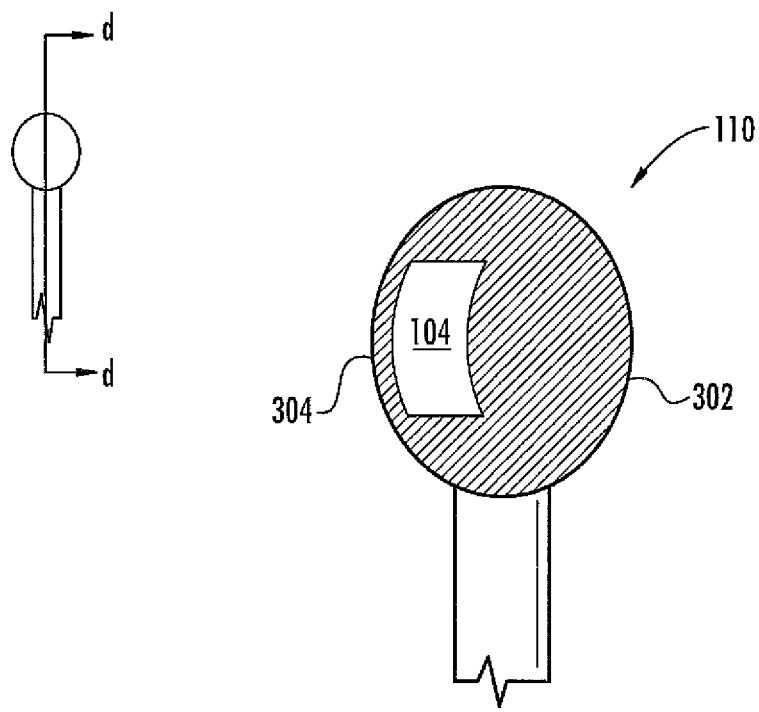

FIG. 3B shows a cross section d-d of another embodiment of second means for controlling a vehicle 110, wherein at least one second sensor 104 is embedded in shift knob 302 of second means for controlling a vehicle 110. In a further embodiment, at least one second sensor 104 is positioned near the surface of at least one second means for controlling a vehicle 110, and is covered and/or concealed by an outer portion 304 of shift knob 302. In some embodiments, outer portion 304 may be of sufficient thinness so as to allow at least one second sensor 104 to detect the presence of an operator's hand near sensor 104. In embodiments where at least one second sensor 104 is a thermal sensor, outer portion 304 may be formed of a highly thermal conductive material, such as metal, or a highly conductive fiber.

Figure 4A:
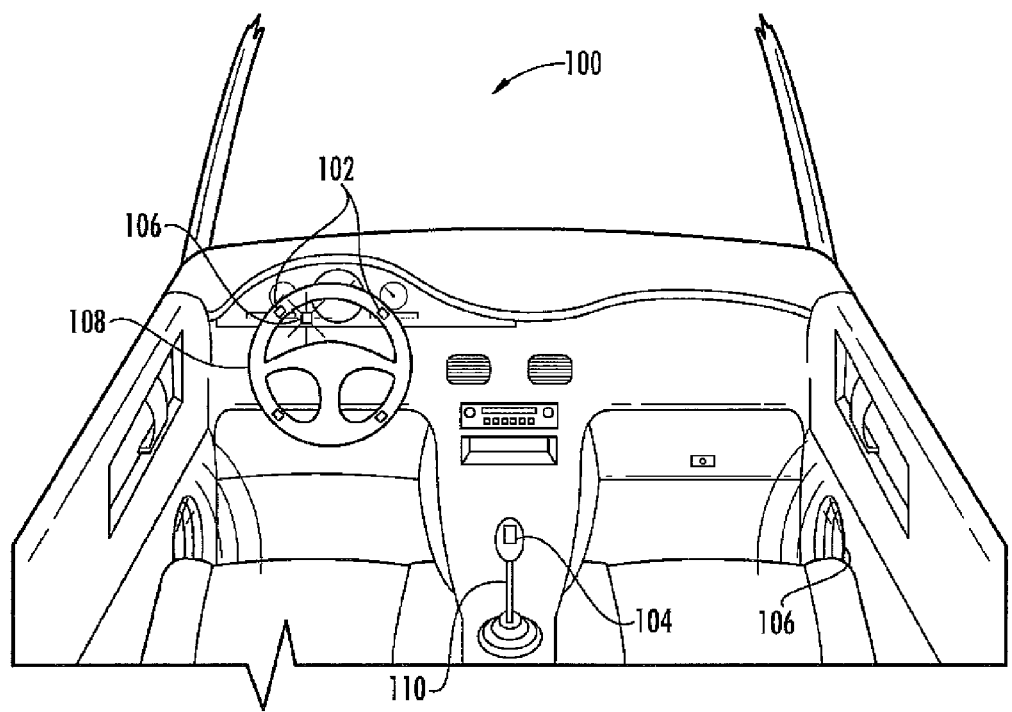
FIGS. 4A and 4B show a system in accordance with various embodiments.
Figure 4B:
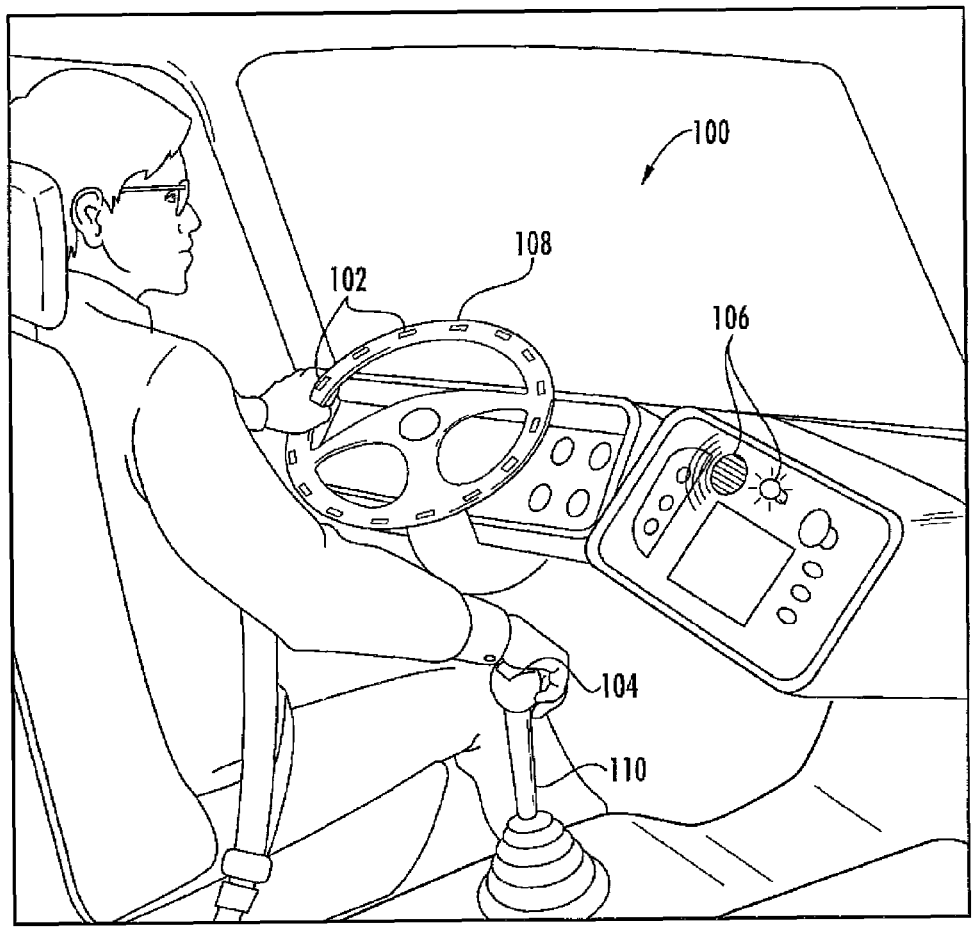

Referring now to FIGS. 4A and 4B, further embodiments of system 100 are shown, wherein system 100 is provided in a passenger and/or commercial vehicle, such as, but not limited to, a car (as shown in FIG. 4A), and/or a truck or bus (as shown in FIG. 4B).

System 100 may comprise of at least one first sensor 102 connected to at least one first means for controlling a vehicle 108, such as a steering wheel, and an alarm 106. System 100 may further comprise of at least one second sensor 104, connected to at least one second means for controlling a vehicle 110, such as a shifter. In various embodiments, alarm 106 may be any kind of alarm, including, but not limited to, an audible alarm, which may include a speaker, a visual alarm, which may include a light, and a tactile alarm, which may include a vibrator.

In further embodiments, system 100 may comprise at least one processor (not shown) electronically connected to at least one first sensor 102, at least one second sensor 104, and at least one alarm 106. The processor may be positioned anywhere in a vehicle, such as, but not limited to, the vehicle dashboard, under the vehicle dashboard, in the engine bay, in the center console, under a seat, and the like. Furthermore, the processor may be any kind of processor, including, but not limited to, a central processing unit (CPU), a microprocessor, a video processor, a front end processor, a coprocessor, a single-core processor, a multi-core processor, and the like.

In yet a further embodiment, system 100 may comprise computer executable instructions readable by the at least one processor and operative to determine whether the at least one first sensor and/or the at least one second sensor has detected the presence or absence of at least one operator's hand, and activate or deactivate the at least one alarm. The computer executable instructions may be written in any computer language, such as, but not limited to, C++, Java, and the like. In a further embodiment, the computer executable instructions may be stored on the processor and/or a storage means electronically connected to the processor. The storage means may be any kind of storage means, such as, but not limited to, a hard drive, a solid state drive, random access memory, a CD-R, CD-RW, a DVD, other forms of computer readable medium, and any other means for storing computer information, such as computer executable instructions.

In some embodiments, system 100 may be powered by an external power source, such as the vehicle's battery and/or alternator. Alternatively, system 100 may be powered by an internal power source, such as a battery. Accordingly, system 100 may include a power converter and/or adapter to adjust the voltage received from the external power source to an appropriate level, as required by system 100.

Figure 5A:
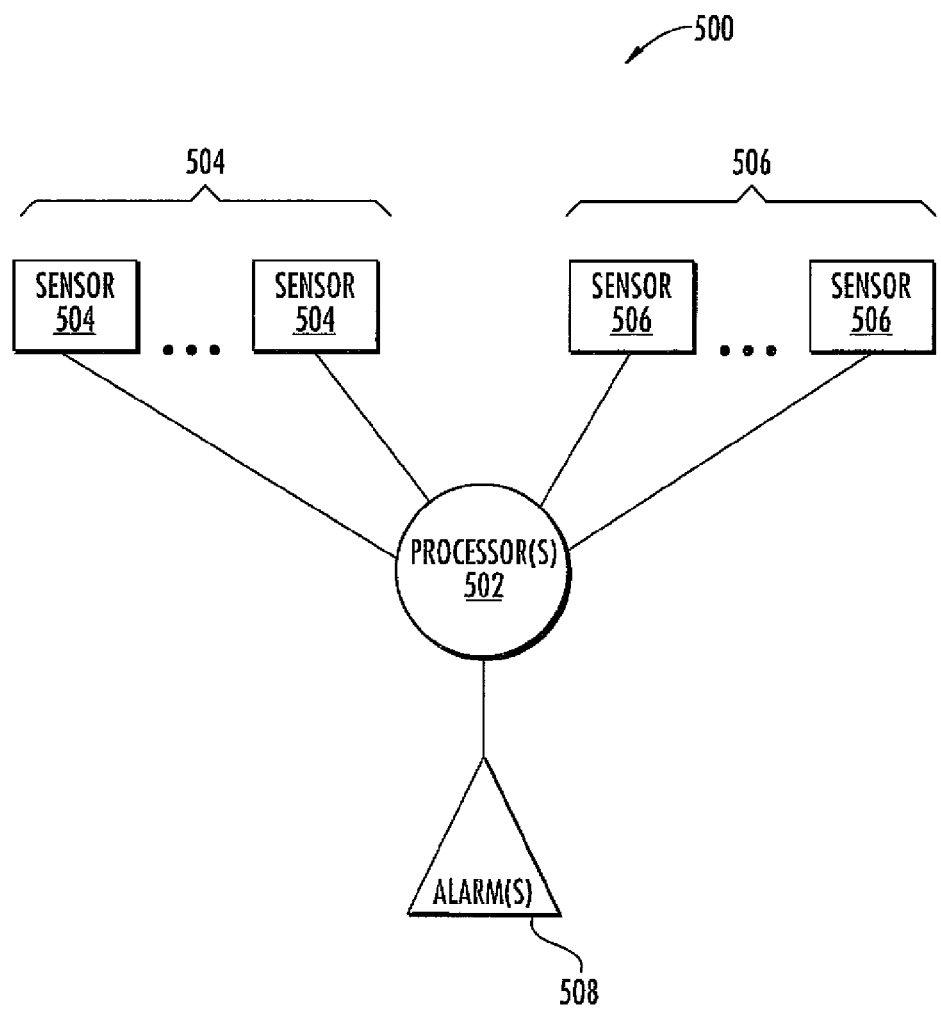
FIGS. 5A through 5C show a system in accordance with various other embodiments.

Referring now to FIG. 5A, system 500 is shown in accordance with one embodiment. System 500 comprises at least one processor 502, a first set of sensors 504 connected to a first means for controlling a vehicle (as shown in FIG. 5B, by reference to numeral 510) and electronically connected to at least one processor 502, a second set of sensors 506 connected to a second means for controlling a vehicle (as shown in FIG. 5C, by reference to numeral 512) and electronically connected to at least one processor 502, at least one alarm 508 electronically connected to at least one processor 502, and computer executable instructions (not shown) readable by at least one processor 502 and operative to activate at least one alarm 508 when first set of sensors 504 detects the absence of an operator's hand, and second set of sensors 506 detects the absence of an operator's hand.

In some embodiments, at least one processor 502 may be any kind of processor, including, but not limited to, a central processing unit (CPU), a microprocessor, a video processor, a front end processor, a coprocessor, a single-core processor, a multi-core processor, and the like. At least one processor 502 may be positioned on a means for controlling a vehicle, or may be positioned elsewhere in a vehicle, such as under the dashboard, under the steering column, under a seat, in the center console, in the engine bay, and/or any other practical location.

In some embodiments, first set of sensors 504 may be any kind of sensors, including, but not limited to, capacitive sensors, thermal sensors, temperature sensors, pressure sensors, light sensors, optical sensors, photoelectric sensors, and the like, or any combination thereof.

Figure 5B:
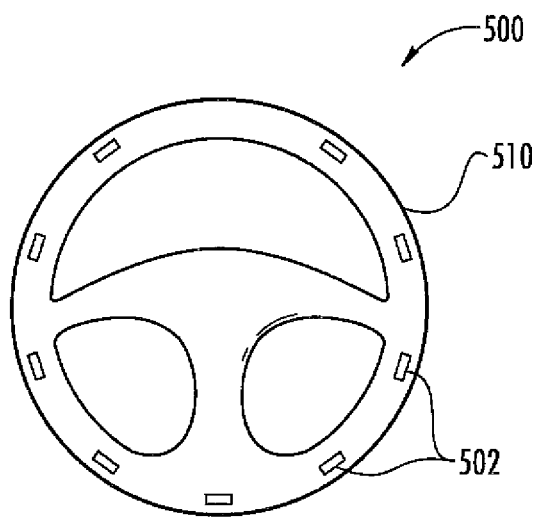
Figure 5C:
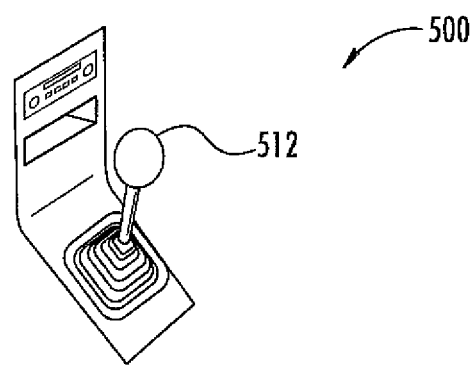

FIG. 5B shows one embodiment of system 500, wherein first means for controlling a vehicle 510 may be steering wheel. In such an embodiment, first set of sensors 504, may be positioned along the circumference of means for controlling a vehicle 510, namely the steering wheel as shown in FIG. 5B. In alternate embodiments, the first means for controlling a vehicle may be any type of means for controlling a vehicle, including, but not limited to, a lever, a pedal, a shifter, a joystick, a button, and the like.

In another embodiment of system 500, as shown in FIG. 5C, second means for controlling a vehicle 512 may be a shifter. In such an embodiment, second set of sensors 506, may be positioned near the surface or embedded in second means for controlling a vehicle 512. In alternate embodiments, second means for controlling a vehicle 512 may be any type of means for controlling a vehicle, including, but not limited to, a lever, a pedal, a steering wheel, a joystick, a button, and the like.

Figure 6A:
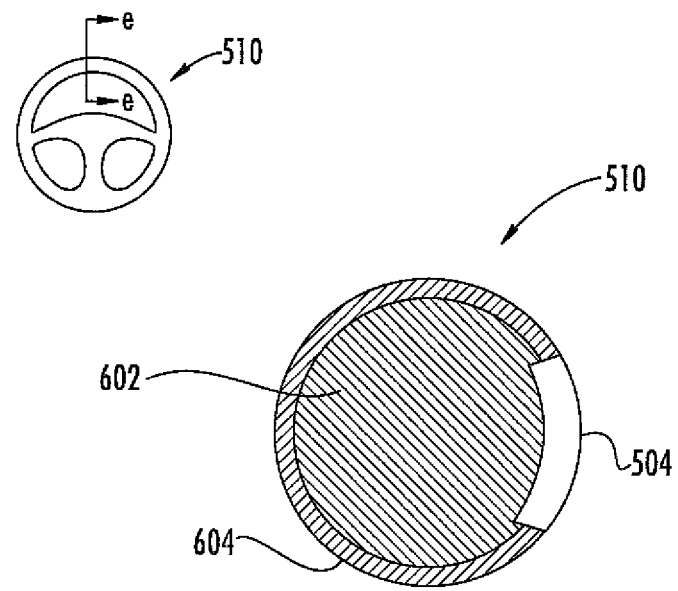
FIGS. 6A and 6B show cross sections of a system in accordance with various embodiments.

Referring now to FIG. 6A, a cross section e-e of one embodiment of first means for controlling a vehicle 510 is shown, wherein at least one of first set of sensors 504 is positioned at the surface of means for controlling a vehicle 108. In embodiments where first means for controlling a vehicle 510 is a steering wheel, the steering wheel may comprise a core 602 and a cover 604. In such embodiments, at least one of first set of sensors 504 may be embedded into cover 604 such that it appears at the surface of first means for controlling a vehicle 510, as shown in FIG. 6A.

Figure 6B:
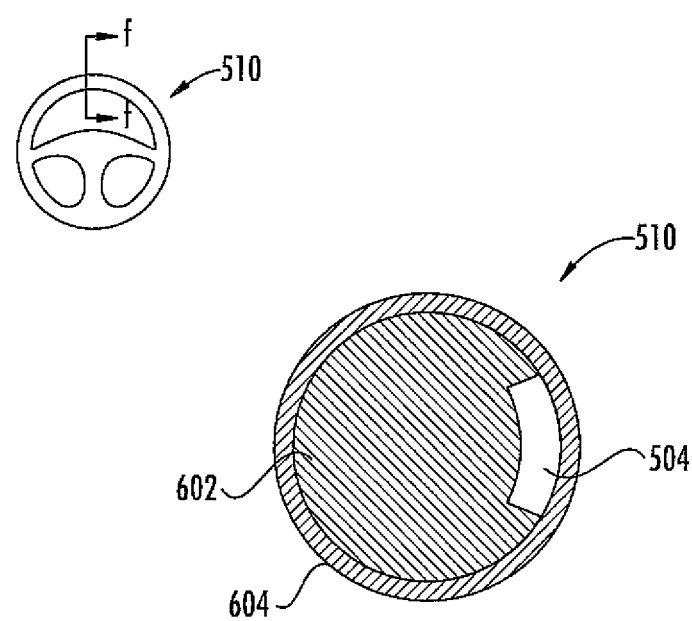

FIG. 6B shows a cross section f-f of another embodiment of first means for controlling a vehicle 510, wherein at least one of first set of sensors 504 is embedded in core 602 of the steering wheel. In a further embodiment, at least one of first set of sensors 504 is positioned near the surface of first means for controlling a vehicle 510, and is covered and/or concealed by cover 604. In some embodiments, cover 604 may be of sufficient thinness so as to allow at least one sensor of first set of sensors 504 to detect the presence of an operator's hand near the first set of sensors 504. In embodiments where first set of sensors 504 comprises a thermal sensor, cover 204 may be formed of a highly thermal conductive material, such as metal, or a highly conductive fiber.

Figure 7A:
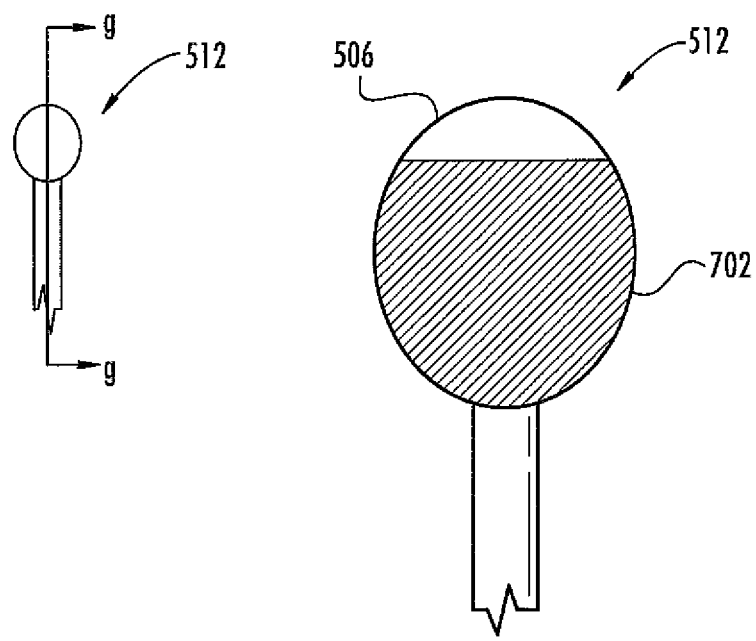
FIGS. 7A and 7B show cross sections of a system in accordance with various other embodiments.

Referring now to FIG. 7A, a cross section g-g of one embodiment of second means for controlling a vehicle 512 is shown, wherein at least one sensor of second set of sensors 506 is positioned at the surface of means for controlling a vehicle 512. In embodiments where second means for controlling a vehicle 512 is a shifter, the shifter wheel may comprise a shift knob 702. In such embodiments, at least one sensor of second set of sensors 506 may be connected to shift knob 702 such that it appears at the surface of second means for controlling a vehicle 512, as shown in FIG. 7A.

Figure 7B:
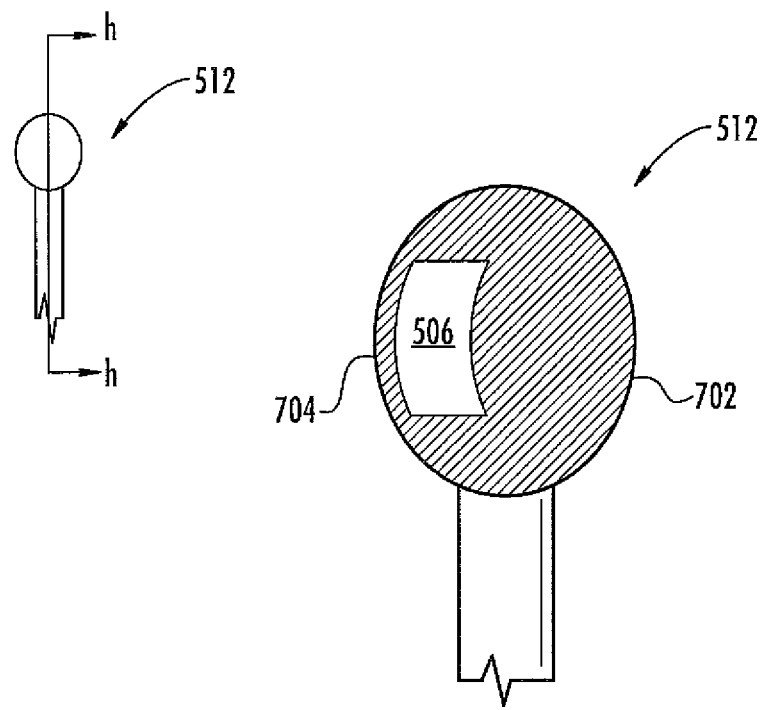

FIG. 7B shows a cross section h-h of another embodiment of second means for controlling a vehicle 512, wherein at least one sensor of the second set of sensors 506 is embedded in shift knob 702 of second means for controlling a vehicle 512. In a further embodiment, at least one sensor of the second set of sensors 506 is positioned near the surface of second means for controlling a vehicle 512, and is covered and/or concealed by an outer portion 704 of shift knob 702. In some embodiments, outer portion 704 may be of sufficient thinness so as to allow at least one sensor of the second set of sensors 506 to detect the presence of an operator's hand near sensor 506. In embodiments where at least one sensor of the second set of sensors 506 is a thermal sensor, outer portion 704 may be formed of a highly thermal conductive material, such as metal, or a highly conductive fiber.

Figure 8A:
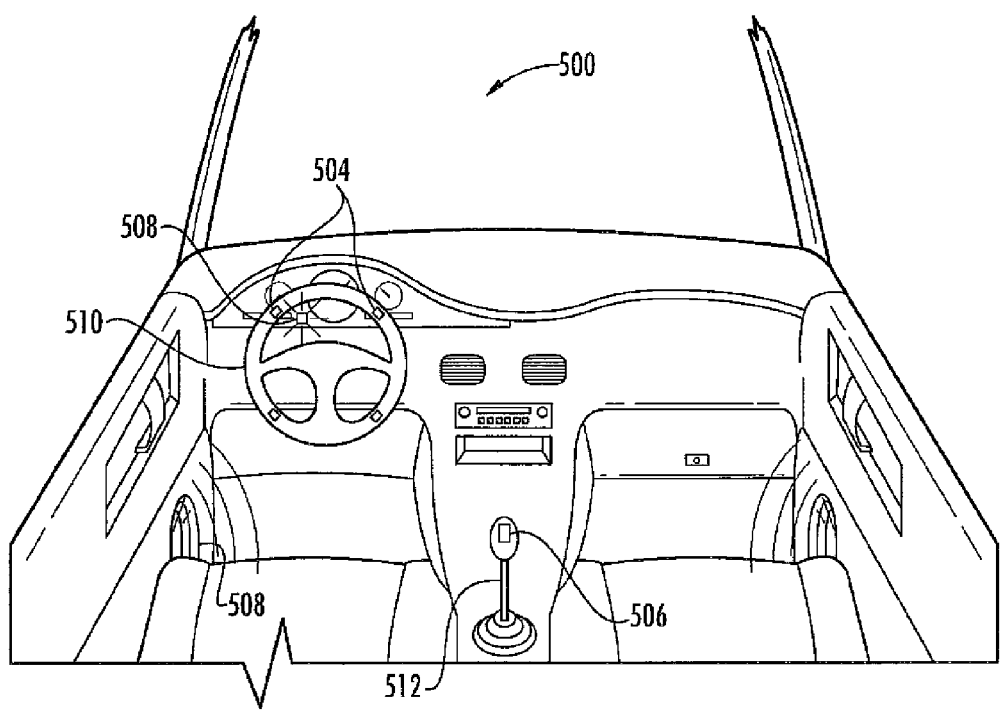
FIGS. 8A and 8B show a system in accordance with various embodiments.
Figure 8B:
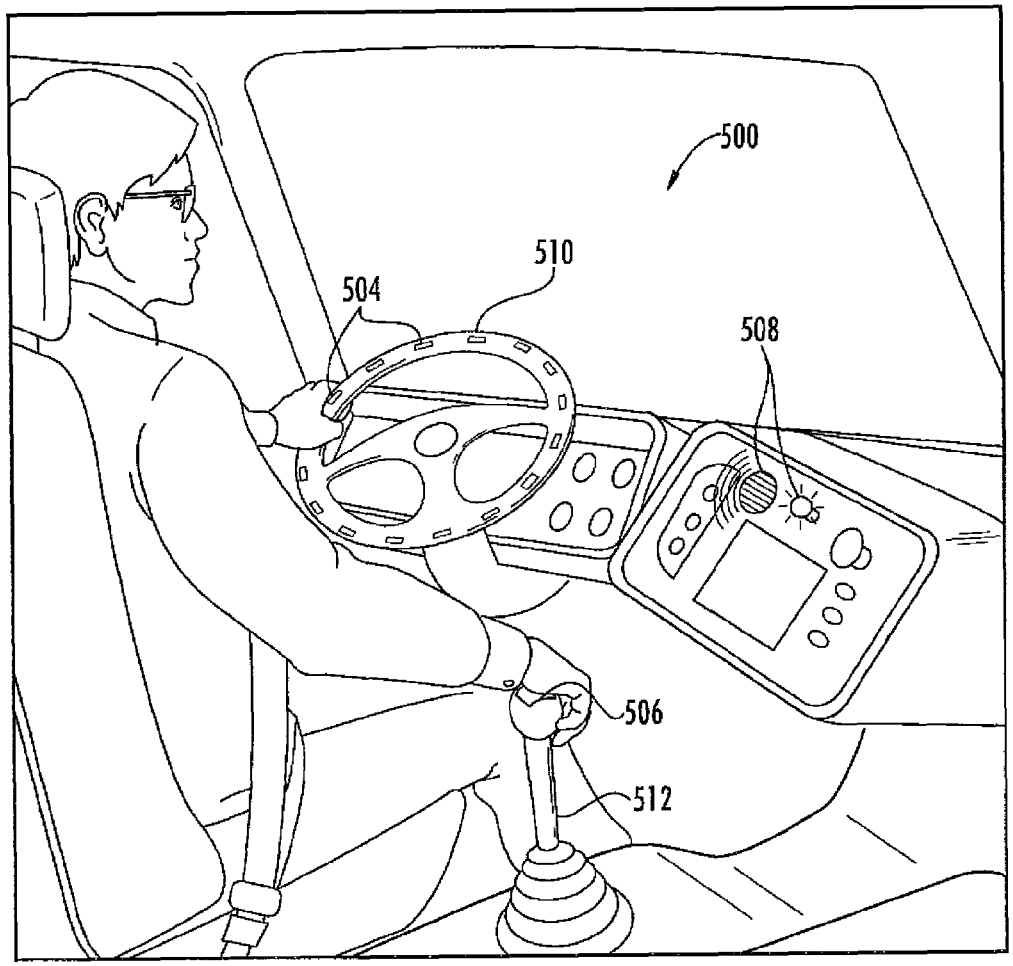

Referring now to FIGS. 8A and 8B, further embodiments of system 500 are shown, wherein system 500 is provided in a passenger and/or commercial vehicle, such as, but not limited to, a car (as shown in FIG. 8A), and/or a truck or bus (as shown in FIG. 8B).

System 500 may comprise of first set of sensors 504 connected to first means for controlling a vehicle 510, such as a steering wheel, and alarm 508. System 500 may further comprise of second set of sensors 506, connected to second means for controlling a vehicle 512, such as a shifter.

In some embodiments, system 500 may be powered by an external power source, such as the vehicle's battery and/or alternator. Alternatively, system 500 may be powered by an internal power source, such as a battery. Accordingly, system 500 may include a power converter and/or adapter to adjust the voltage received from the external power source to an appropriate level, as required by system 500.

In some embodiments, at least one alarm 508 may be any kind of alarm, including, but not limited to, an audible alarm, which may comprise a speaker and amplifier, a visual alarm, which may comprise a light bulb or light emitting diode, and a tactile alarm, which may comprise a vibrator.

In some embodiments, the computer executable instructions may be written in any computer language, such as, but not limited to, C++, Java, and the like. In a further embodiment, the computer executable instructions may be stored on the processor and/or a storage means electronically connected to the processor. The storage means may be any kind of storage means, such as, but not limited to, a hard drive, a solid state drive, random access memory, a CD-R, CD-RW, a DVD, other forms of computer readable medium, and any other means for storing computer information, such as computer executable instructions.

In one embodiment of system 500, the computer executable instructions may be further operative to activate the at least one alarm 508 a predetermined period of time after first set of sensors 504 detects the absence of an operator's hand and second set of sensors 506 detects the absence of an operator's hand. In some embodiments, the predetermined period of time may be any period of time, such as, but not limited to any time in the range of zero to sixty seconds. In other embodiments, the period of time may be in the range of zero to infinite seconds. In such embodiments, allowing for a predetermined period of time before activating the alarm allows for an operator to engage in normal driving activities, such as raising or lowering windows, changing the radio, turning on the climate control, scratching, and the like.

In a further embodiment, the computer executable instructions are operative to activate at least one alarm 508 immediately after first set of sensors 504 detects the absence of an operator's hand and second set of sensors 506 detects the absence of an operator's hand.

In yet another embodiment, the computer executable instructions are further operative to activate at least one alarm 508 immediately after first set of sensors 504 detects the absence of an operator's hand and second set of sensors 506 detects the absence of an operator's hand, but only if at least one alarm 508 has been previously activated within a predetermined period of time. Such embodiments may prevent operators from performing distracting activities repeatedly. In some embodiments, the predetermined period of time may be any predetermined period of time, such as, but not limited to, one minute.

In yet a further embodiment, the computer executable instructions may be operative to deactivate the at least one alarm when first set of sensors 504 detects the presence of both of the operator's hands, or when first set of sensors 504 detects the presence of one of the operator's hands and second set of sensors 506 detects the presence of the operator's other hand.

Figure 9:
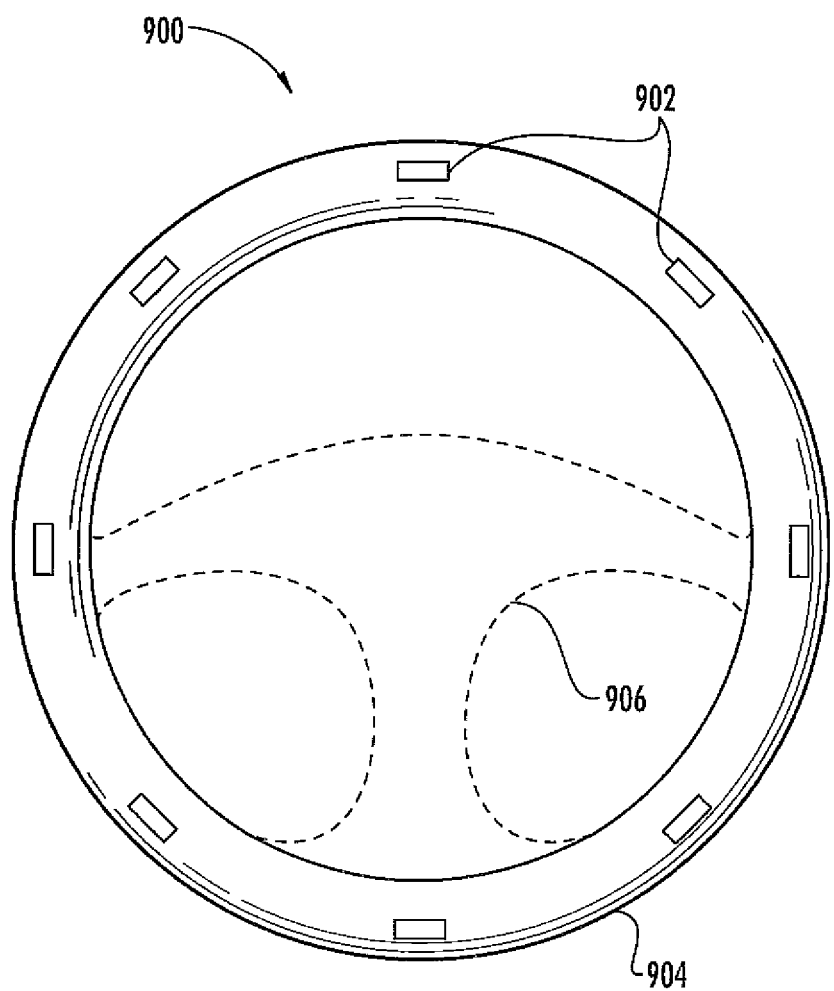
FIG. 9 shows an apparatus in accordance with one embodiment.

Referring now to FIG. 9, an apparatus 900 is shown in accordance with one embodiment. Apparatus 900 may comprise at least one sensor 902, and at least one means for connecting 904 at least one sensor 902 to at least one means for controlling a vehicle 906 (shown in broken lines), wherein at least one sensor 902 is connected to at least one means for connecting 904 at least one sensor 902 to at least one means for controlling a vehicle 906.

In some embodiments, at least one sensor 902 may be any type of sensor, including, but not limited to, a capacitive sensor, a thermal sensor, temperature sensor, a pressure sensor, a light sensor, an optical sensor, a photoelectric sensor, and the like.

In some embodiments at least one means for connecting 904 at least one sensor 902 to at least one means for controlling a vehicle 906, may be any kind of means, such as, but not limited to, a steering wheel cover, a shift knob cover, a clip, a screw, a magnet, a sleeve, and the like.

In a further embodiment, at least one means for connecting 904 at least one sensor 902 to at least one means for controlling a vehicle 906 includes at least one means for permanently connecting at least one sensor 902 to at least one means for controlling a vehicle 906, such as non-removable stitching or holes for receiving thread, permanent clips, screws, glue, and the like.

In yet a further embodiment, at least one means for connecting 904 at least one sensor 902 to at least one means for controlling a vehicle 906 includes at least one means for detachably connecting at least one sensor 902 to at least one means for controlling a vehicle 906, such as removable stitching or holes for receiving thread, removable clips, removable screws, non-permanent glue, and the like.

In yet a further embodiment, apparatus 900 further comprises at least one means for receiving electrical power connected to at least one means for connecting 904 at least one sensor 902 to at least one means for controlling a vehicle 906. In some embodiments, the means for receiving electrical power may be a battery terminal, a power socket and/or terminal, a battery, and the like. In some embodiments, the at least one means for receiving electrical power may be operative to be connected via a wire to a vehicle's battery and/or alternator.

In one embodiment, apparatus 900 further comprises at least one means for detecting removal of at least one means for connecting 904 at least one sensor 902 to at least one means for controlling a vehicle 906. The at least one means for detecting removal may include, but is not limited to, a device that can detect when a permanent clip has been undone or broken, or when means 904 has been damaged or removed, such as a wire running along means 904, which thereby creates a circuit, which, if broken, would trigger an alma', or would signal for a communications means, such as, but not limited to, a GSM modem, which may be connected to apparatus 900, to contact a remote station.

In some embodiments, apparatus 900 may be used in connection with the various embodiments of systems, apparatuses, methods, and/or components thereof, described herein with reference to FIGS. 1-10.

Figure 10:
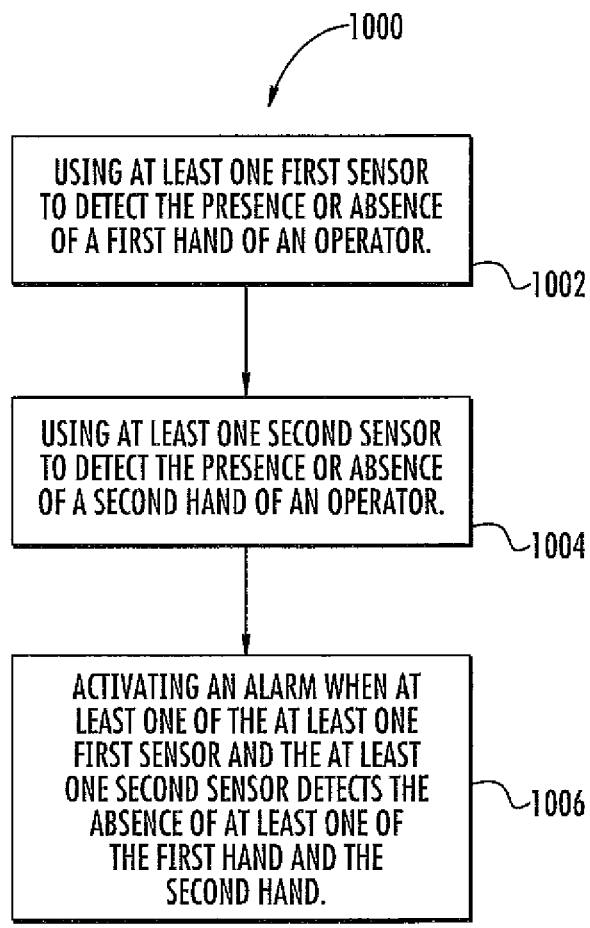
FIG. 10 shows a block diagram representing a method in accordance with one embodiment.

Referring now to FIG. 10, a block diagram representing method 1000 is shown, in accordance with one embodiment. Method 1000 comprises using at least one first sensor to detect the presence or absence of a first hand of an operator (block 1002), using at least one second sensor to detect the presence or absence of a second hand of an operator (block 1004), and activating an alarm when at least one of the at least one first sensor and the at least one second sensor detects the absence of at least one of the first hand and the second hand (block 1006).

In some embodiments, activating an alarm when at least one of the at least one first sensor and the at least one second sensor detects the absence of at least one of the first hand and the second hand (block 1006) further comprises activating an alarm after a predetermined period of time after at least one of the at least one first sensor and the at least one second sensor detects the absence of at least one of the first hand and the second hand. In such embodiments, allowing for a predetermined period of time before activating the alarm allows for an operator to engage in normal driving activities, such as raising or lowering windows, changing the radio, turning on the climate control, scratching, and the like. The predetermined period of time may be any period of time, such as, but not limited to, one minute, thirty seconds, ten seconds, five seconds, and the like.

In one embodiments, at least one of the at least one first sensor and the at least one second sensor is connected to at least one first means for controlling a vehicle, such as, but not limited to, a lever, a pedal, a steering wheel, a joystick, shifter, a button, and the like. In another embodiment, at least one of the at least one first sensor and the at least one second sensor is connected to at least one second means for controlling a vehicle, such as, but not limited to, a lever, a pedal, a steering wheel, a joystick, shifter, a button, and the like.

In another embodiment, method 1000 further comprises deactivating the alarm when either of the at least one first sensor and the at least one second sensor detects the presence of both of the operator's hands, or when the at least one first sensor detects the presence of one of the operator's hands and the at least one second sensor detects the presence of the operator's other hand. In such an embodiment, deactivating the alarm when either of the at least one first sensor and the at least one second sensor detects the presence of both of the operator's hands, or when the at least one first sensor detects the presence of one of the operator's hands and the at least one second sensor detects the presence of the operator's other hand may include deactivating the alarm when the operator has one hand on a steering wheel and the other hand on a shifter, or both hands on the steering wheel.

In yet another embodiment, method 1000 further comprises using at least one processor to use the at least one first sensor, the at least one second sensor, and activate and/or deactivate the alarm. In some embodiments, the processor may be operated through computer executable instructions.

In some embodiments, method 1000 may use, be used in, be used in conjunction with, or as a part of the various embodiments of systems, methods, and apparatuses described throughout the present disclosure with reference to FIGS. 1-10 and elsewhere.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
    a. at least one processor connected to at least one vehicle;
    b. at least one first sensor connected to the at least one processor and at least one first means for controlling the vehicle;
    c. a camera connected to the at least one processor, wherein the camera comprises a field of view directed towards a position in the vehicle where an operator of the vehicle resides while operating the vehicle, as well as a position where the operator's hands must be maintained while operating the vehicle; and
    d. computer executable instructions embedded within a medium readable by the at least one processor and operative to:
        i. use the at least one first sensor to determine whether the operator's hand is positioned on the at least one first means for controlling the vehicle;

ii. use the camera to capture an image of the operator or the operator's hands, analyze the image, and determine if the operator's hands are positioned on the at least one first means for controlling the vehicle, or at least one second means for controlling the vehicle, or if the operator's hands are not positioned on either the at least one first means or at least one second means for controlling the vehicle; and iii. if it is determined by using either the at least one first sensor or the camera that the operator's hands are not positioned on the at least one first means for controlling the vehicle or the at least one second means for controlling the vehicle, then activate at least one alarm electronically connected to the at least one processor, wherein activating at least one alarm comprises activating at least one alarm after a first predetermined period of time, and activating at least one alarm immediately if the at least one alarm has been previously activated within a second predetermined period of time.

2. The system of claim 1, further comprising at least one second sensor connected to the at least one second means for controlling a vehicle and electronically connected to the at least one alarm.

3. The system of claim 1, wherein the at least one first sensor is a type of sensor selected from the group consisting essentially of a capacitive sensor, a thermal sensor, a pressure sensor, and a light sensor.

4. The system of claim 1, wherein at least one of the at least one first means for controlling a vehicle is a type of means for controlling a vehicle selected from the group consisting essentially of: a steering wheel, a lever, a pedal, a shifter, a joystick, and a button.

5. The system of claim 1, wherein the computer executable instructions are operative to determine when at least one, any, or all of the at least one processor, at least one first sensor, and camera are removed from the vehicle or deactivated, and activate the alarm if it is determined that at least one, any, or all of the at least one processor, at least one first sensor, and camera are removed from the vehicle or deactivated.

6. The system of claim 5, wherein the computer executable instructions are operative to:

a. deactivate the at least one alarm when the at least one first sensor detects the presence of both of the operator's hands, or when it is determined by using the at least one camera that both of the operator's hands are positioned on at least one means for controlling the vehicle.

7. The system of claim 5, wherein the computer executable instructions are operative to use a communications means to contact a remote station if the at least one, any, or all of the at least one processor, at least one first sensor, or camera are removed from the vehicle or deactivated.

8. A system comprising:
a. at least one processor;
b. a first set of sensors connected to a first means for controlling a vehicle and electronically connected to the at least one processor, wherein the first set of sensors comprise at least one sensor;
c. a second set of sensors connected to a second means for controlling a vehicle and electronically connected to the at least one processor, wherein the second set of sensors comprise at least one sensor;
d. at least one alarm electronically connected to the at least one processor; and
e. computer executable instructions embedded within a medium readable by the at least one processor and operative to:

i. activate the at least one alarm, after a first predetermined period of time, when the first set of sensors detects the absence of an operator's hand, and the second set of sensors detects the absence of an operator's hand, or when only one of the first set of sensors or the second set of sensors detects the presence of an operator's hand;

ii. activate the at least one alarm, immediately, when the at least one alarm has been previously activated within a second predetermined period of time; and iii. deactivate the at least one alarm when the first set of sensors detects the presence of both of an operator's hands, when the second set of sensors detects the presence of both of an operator's hands, or when the first set of sensors detects the presence of an operator's hand and the second set of sensors detects the presence of an operator's hand.

9. The system of claim 8, wherein the first means for controlling a vehicle is a steering wheel and the second means for controlling a vehicle is a shifter.

10. The system of claim 8, wherein the computer executable instructions are operative to determine when at least one, any, or all of the first set of sensors and second set of sensors are removed from the vehicle or deactivated, and activate the alarm if it is determined that at least one, any, or all of the first set of sensors and second set of sensors are removed from the vehicle or deactivated.

11. The system of claim 8, wherein the at least one alarm is a type of alarm selected from the group consisting essentially of an audible alarm, a visual alarm, and a tactile alarm.

12. The system of claim 8, further comprising at least one camera connected to the at least one processor.

13. The system of claim 12, wherein the at least one camera comprises a field of view directed towards a position in the vehicle where an operator of the vehicle resides while operating the vehicle, as well as a position where the operator's hands must be maintained while operating the vehicle.

14. The system of claim 12, wherein the computer executable instructions are further operative to use the camera to capture an image of the operator or the operator's hands, analyze the image, and determine if the operator's hands are positioned on the first means for controlling the vehicle, or the second means for controlling the vehicle, or if the operator's hands are not positioned on either the first means or the second means for controlling the vehicle.

15. The system of claim 8, wherein the second predetermined period of time is a period of at least one minute.

16. The system of claim 12, wherein the computer executable instructions are further operative to activate the at least one alarm if it is determined by using the camera that the operator's hands are not positioned on the first means for controlling the vehicle or the second means for controlling the vehicle.

17. An apparatus comprising:
a. at least one processor;
b. at least one camera having a field of view;
c. at least one sensor;
d. at least one means for connecting the at least one sensor to at least one means for controlling a vehicle;
e. at least one means for connecting the processor to the vehicle;
f. at least one means for connecting the at least one camera to the vehicle such that the at least one camera's field of view is directed towards a position in the vehicle where an operator of the vehicle resides while operating the vehicle, as well as a position where the operator's hands must be maintained while operating the vehicle;

g. at least one means for connecting the at least one processor to the at least one sensor and the at least one camera; and h. at least one alarm for activating when the operator's hands are not maintained on the at least one means for controlling the vehicle, wherein activating the at least one alarm comprises activating the at least one alarm after a first predetermined period of time, and activating the at least one alarm immediately if the at least one alarm has been previously activated within a second predetermined period of time.

18. The apparatus of claim 17, wherein the at least one sensor is a type of sensor selected from the group consisting essentially of: a capacitive sensor, a thermal sensor, a pressure sensor, and a light sensor.

19. The apparatus of claim 17, wherein the at least one means for connecting the at least one sensor to the at least one means for controlling a vehicle comprises a steering wheel cover.

20. The apparatus of claim 17, wherein the at least one means for connecting the at least one sensor to the at least one means for controlling a vehicle comprises at least one means for permanently connecting the at least one sensor to the at least one means for controlling a vehicle.

21. The apparatus of claim 17, wherein the at least one means for connecting the at least one sensor to the at least one means for controlling a vehicle comprises at least one means for detachably connecting the at least one sensor to the at least one means for controlling a vehicle.

22. The apparatus of claim 17, further comprising at least one means for detecting removal of the at least one means for connecting the at least one sensor to the at least one means for controlling a vehicle, removal of the at least one sensor, at least one processor, at least one camera, at least one means for connecting the at least one processor to the vehicle, at least one means for connecting the at least one camera to the vehicle, or at least one means for receiving electrical power.

23. The apparatus of claim 22, further comprising at least one communications means for communicating with a remote station if the at least one means for detecting removal detects the removal of the at least one means for connecting the at least one sensor to the at least one means for controlling a vehicle, removal of the at least one sensor, at least one processor, at least one camera, at least one means for connecting the at least one processor to the vehicle, at least one means for connecting the at least one camera to the vehicle, or at least one means for receiving electrical power.

24. A method for improving operator awareness, comprising:

a. using at least one first sensor connected to a first means for controlling a vehicle to detect the presence or absence of a first hand of an operator of the vehicle;

b. using at least one second sensor connected to a second means for controlling the vehicle to detect the presence or absence of a second hand of the operator;

c. using at least one camera connected to the vehicle to capture an image of the operator or the operator's hands, analyze the image, and determine if the operator's hands are positioned on the first means for controlling the vehicle, or the second means for controlling the vehicle, or if the operator's hands are not positioned on either the first means or the second means for controlling the vehicle; and d. activating an alarm when at least one of the at least one first sensor and the at least one second sensor detects the absence of at least one of the first hand and the second hand, or if it is determined by using the at least one camera that the operator's hands are not positioned on the means for controlling the vehicle or the second means for controlling the vehicle, wherein activating an alarm comprises activating an alarm after a first predetermined period of time and activating an alarm immediately if the alarm has been previously activated within a second predetermined period of time.

25. The method of claim 24, further comprising contacting a remote station.

26. The method of claim 25, further comprising contacting a remote station if it is determined that any or all of the at least one first sensor, at least one second sensor, or at least one camera are removed from the vehicle or deactivated.

27. The method of claim 24, wherein the second predetermined period of time is at least one minute.

28. The method of claim 24, further comprising deactivating the alarm when either of the at least one first sensor and the at least one second sensor detects the presence of both of the operator's hands, when the at least one first sensor detects the presence of one of the operator's hands and the at least one second sensor detects the presence of the operator's other hand, or when it is determined by using the at least one camera that both of the operator's hands are positioned on either or both of the first means for controlling the vehicle or the second means for controlling the vehicle.

29. The method of claim 24, further comprising determining when any or all of the at least one first sensor, at least one second sensor, and at least one camera are removed from the vehicle or deactivated, and activating the alarm if it is determined that any or all of the at least one first sensor, at least one second sensor, and at least one camera are removed from the vehicle or deactivated.

* * * * *